United States Patent [19]

Nozaka et al.

[11] Patent Number: 4,884,639
[45] Date of Patent: Dec. 5, 1989

[54] DEVICE FOR CONNECTING WORKING IMPLEMENT TO TRACTOR

[75] Inventors: Kenkichi Nozaka; Yosihiro Kawahara; Takashi Fukutaka, all of Osaka, Japan

[73] Assignee: Kubota, Ltd., Osaka, Japan

[21] Appl. No.: 167,184

[22] Filed: Mar. 11, 1988

[30] Foreign Application Priority Data

Mar. 19, 1987 [JP] Japan .................. 62-66658
Mar. 19, 1987 [JP] Japan .................. 62-66659

[51] Int. Cl.⁴ ............................. A01B 59/06
[52] U.S. Cl. ...................... 172/47; 172/272; 280/477
[58] Field of Search .......... 172/275, 274, 273, 272, 172/47, 439; 280/477, 415 A, 461 A; 180/53.3, 14.4

[56] References Cited

U.S. PATENT DOCUMENTS

| | | | |
|---|---|---|---|
| 3,074,501 | 1/1963 | Lane et al. | 172/275 X |
| 3,283,840 | 7/1963 | Lane | 180/14 |
| 3,299,979 | 7/1964 | Restall | 180/14 |
| 3,512,804 | 12/1967 | Siegert | 280/509 |
| 3,807,769 | 4/1974 | Thompson et al. | 280/479 R |
| 3,871,463 | 3/1975 | Geisthoff | 180/14.4 |
| 4,023,638 | 5/1977 | Holmes et al. | 180/14 B |
| 4,071,105 | 1/1978 | von Allwörden | 180/53.3 X |
| 4,090,725 | 5/1978 | Périn | 280/461 A X |
| 4,176,727 | 12/1979 | Périn . | |
| 4,203,238 | 5/1980 | Bangert et al. | 37/118 R |
| 4,512,413 | 4/1985 | Hirata et al. | 172/74 |
| 4,799,563 | 1/1989 | Yukino | 180/14.4 |

FOREIGN PATENT DOCUMENTS

| | | | |
|---|---|---|---|
| 2621162 | 11/1977 | Fed. Rep. of Germany | 172/125 |
| 3612322 | 10/1987 | Fed. Rep. of Germany | 172/47 |
| 55-123207 | 9/1980 | Japan . | |
| 58-216605 | 12/1983 | Japan . | |
| 60-259104 | 12/1985 | Japan . | |
| 56466 | 7/1944 | Netherlands . | |

Primary Examiner—Richard J. Johnson
Assistant Examiner—Jeffrey L. Thompson
Attorney, Agent, or Firm—Birch, Stewart, Kolasch & Birch

[57] ABSTRACT

The top link of a three-point link assembly on a tractor is connected to the two lower links thereof by a connecting assembly at the link ends toward a working implement. The connecting assembly has upper and lower connectors separably engageable with corresponding upper and lower connectable portions of the implement. An extendable transmission shaft having a pair of joints at its respective ends is interposed between the PTO shaft of the tractor and an input shaft of the implement. The connecting assembly has a clutch for operatively connecting an internally splined portion of the implement-side joint to an externally splined portion of the input shaft. The clutch has guides fixed to the connecting assembly and extending longitudinally of the tractor, a tubular case supported by slide members on the guides and movable axially thereof and an operating assembly for the case. The case has the implement-side joint inserted therein. The slide members each have a spring for holding the case translatably and swingably upward or downward relative to the guides.

19 Claims, 10 Drawing Sheets

DEVICE FOR CONNECTING WORKING IMPLEMENT TO TRACTOR

FIELD OF THE INVENTION AND RELATED ART STATEMENT

The present invention relates to a device for connecting a working implement to a tractor, and more particularly to a device for liftably and separably connecting a working implement to a tractor by a three-point link assembly, with an input shaft of the implement separably connected to a PTO shaft of the tractor.

U.S. Pat. No. 4,176,727 discloses a device for liftably and removably connecting a working implement to the rear end of a tractor by a three-point link assembly comprising a central top link and a pair of side lower links, with an input shaft of the implement separably connected to a PTO shaft of the tractor by an extendable transmission shaft having a universal joint at each end thereof, the device being adapted to connect the implement to the tractor easily.

The top link is connected to the lower links at their ends toward the working implement by a connecting assembly. The connecting assembly has an upper connector and a pair of lower connectors which are individually removably engageable with a widthwise central upper portion and opposed side portions of the implement when the connecting assembly is lifted. The connecting assembly has a clutch for removably connecting the implement side universal joint to the input shaft.

The clutch comprises a tubular case provided on the connecting assembly longitudinally of the tractor, a coupling shaft provided in the case concentrically therewith and adapted to be splined to the implement-side universal joint, and a connector-side clutch pawl portion provided on the coupling shaft.

An implement-side clutch pawl portion is splined to the input shaft of the working implement. When the implement is engaged with the connecting assembly, the connector-side pawl portion and the implement-side pawl portion are operatively connected together at the same time.

Although the above device is adapted to connect the working implment to the tractor easily, the transmission of power gives off a great noise since the implement-side univeral joint is operatively connected to the input shaft by the pawl clutch. Moreover, the input shaft of the implement needs to have the clutch pawl portion for operative connection, hence a complex structure.

To overcome the above problem, accordingly, Unexamined Japanese Patent Application SHO 58-216605 discloses the following clutch.

The clutch, which is provided on the connecting assembly, comprises a pair of opposed guide rails mounted on the connecting assembly and extending longitudinally of the tractor, a tubular case mounted on the case and movable forward or rearward for supporting the implement-side universal joint, and operating means for moving the tubular case axially thereof.

After the engagement of the connecting assembly with the working implement for the connection of the implement to the tractor, the tubular case is moved toward the implement by the operating means to spline the implement-side universal joint to the input shaft.

The above arrangement has the advantages that the power can be transmitted with a lower noise than when the pawl clutch is used for the operative connection and that the implement input shaft need not be provided with any additional member, because the implement-side universal joint is splined to the input shaft.

However, the clutch does not have any means for absorbing the upward or vertical deviation of the implement-side universal joint from the axis of the input shaft, so that when the two members are out of alignment with each other upward or downward when to be connected together, there arises the problem that the two memebers are not readily connectable.

OBJECT AND SUMMARY OF THE INVENTION

The main object of the present invention is to provide a connecting device of the type described above by which even when the implement-side joint is upwardly or downwardly out of alignment with the input shaft of the working implement, the two members can be connected together easily by absorbing the misalignment.

To fulfill the above object, the present invention provides the following device.

The tractor to which the invention is applied has a liftable three-point link assembly comprising a central top link and a pair of opposed side lower links, the top link being connected to the lower links at their ends toward a working implement by a connecting assembly. The tractor is provided with a lifting unit for raising and lowering the three-point link assembly and the connecting assembly.

The connecting assembly comprises an upper connector positioned above its widthwise midportion and a pair of lower connectors positioned at its opposite sides, the upper and lower connectors being removably held by corresponding connectable portions of the implement respectively in engagement therewith when the connecting assembly is raised.

An extendable transmission shaft extends between a PTO shaft of the tractor and an input shaft of the working implement substantially longitudinally of the tractor. The transmission shaft has at its opposite ends a tractor joint and an implement joint. The tractor PTO shaft has an externally splined portion removably operatively fitted in an internally splined portion of the tractor joint, while the implement input shaft has an externally splined portion removably operatively fitted in an internally splined portion of the implement joint.

The connecting assembly is provided with a clutch for separably operatively connecting the implement joint to the implement input shaft. The clutch comprises guides positioned substantially longitudinally of the tractor and fixed to the connecting assembly, a tubular case having an axis extending substantially longitudinally of the tractor and supported by slide members on the guides movably in the axial direction, and an operating assembly for the tubular case.

The tubular case has the implement joint inserted therein and is movable axially thereof while extending or contracting the transmission shaft to thereby shift the implement joint between a connecting position where the implement joint is operatively connected to the implement input shaft and a separating position where the implement joint is separate from the input shaft.

The slide member is provided with a holding spring for holding the tubular case on the guide translatably and swingably in an upward or downward direction.

The operating assembly shifts the tubular case from the separating position to the connecting position after the upper and lower connectors of the connecting assembly are respectively held by the upper and lower connectable portions of the working implement in engagement therewith.

BRIEF DESCRIPTION OF THE DRAWINGS

FIGS. 1 to 6 show a first embodiment of the invention;

FIGS. 7 and 8 show a second embodiment of the invention;

FIGS. 9 and 10 show a third embodiment of the invention;

DESCRIPTION OF THE PREFERRED EMBODIMENTS

A first embodiment of the invention will be described below with reference to FIGS. 1 to 6. FIG. 4 shows a tractor T which has a body 1, a seat 2, a pair of opposite front wheels (not shown), rear wheels 3, rear wheel fenders 4, etc.

Mounted on the rear portion of the body 1 is a lifting unit, e.g. a hyraulic lifting unit 5 for lifting a working implement. The unit 5 has a pair of opposed lift arms 6. A PTO shaft 7 extends rearward from the rear end of the body 1.

The working implement, e.g., a side drive rotary tiller C is disposed in the rear of the tractor T and removably liftably connected to the tractor by a three-point link assembly 9.

The three-point link assembly 9 comprises a central top link 10 and a pair of opposite side lower links 11. The lower link 11 is connected to the lift arm 6 by a lift rod 12 at each side of the body 1.

Figure 1:
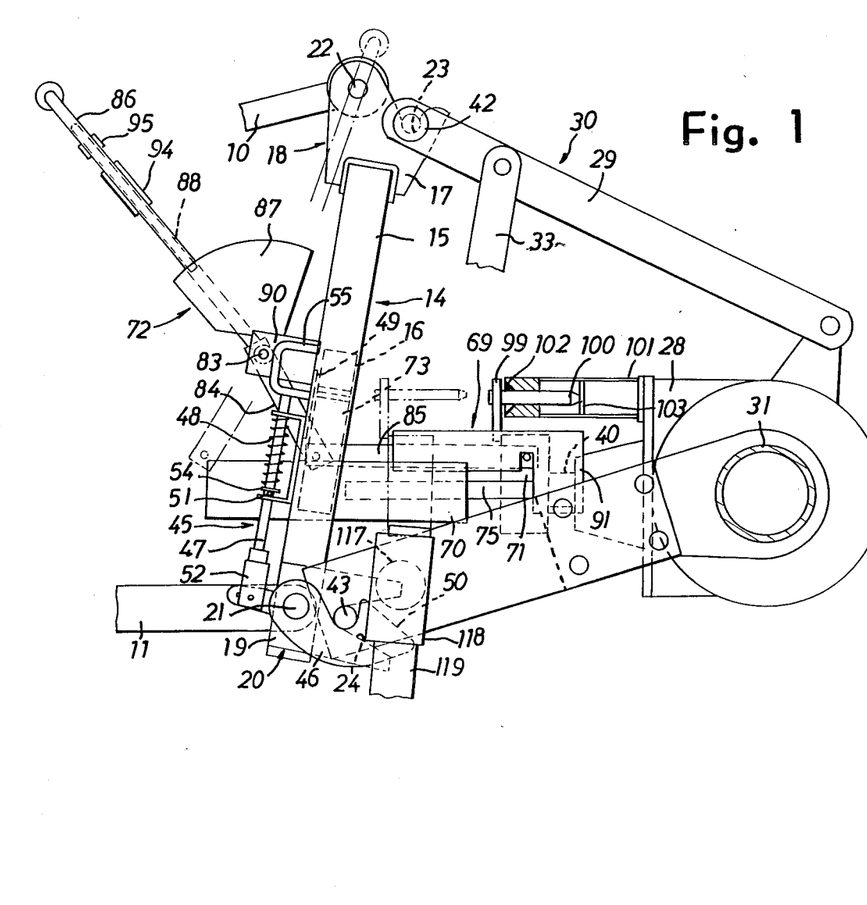
FIGS. 1 and 2 are fragmentary side elevations partly in section and showing the embodiment in different operative positions.
Figure 2:
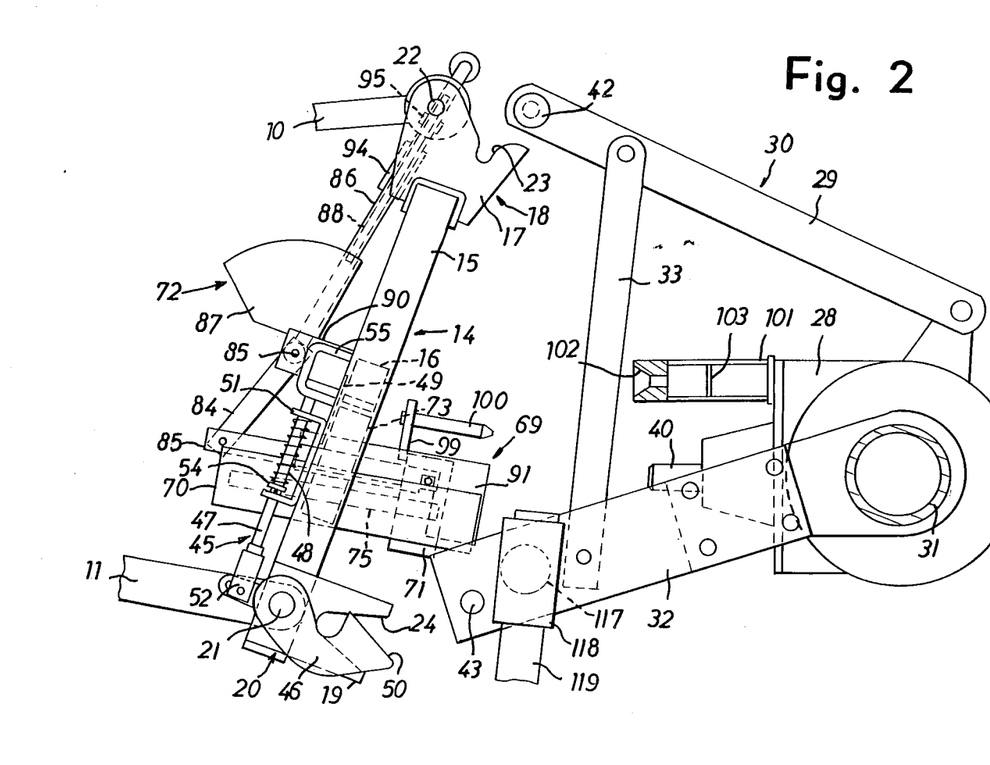
Figure 3:
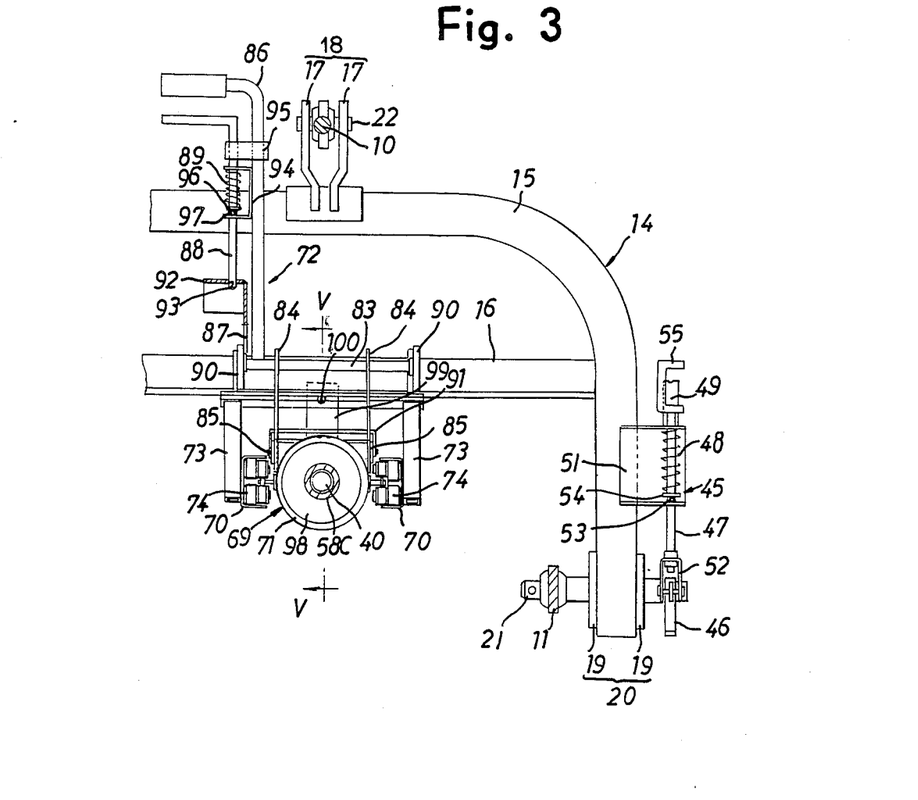
FIG. 3 is a front view partly in section and showing the same.
Figure 4:
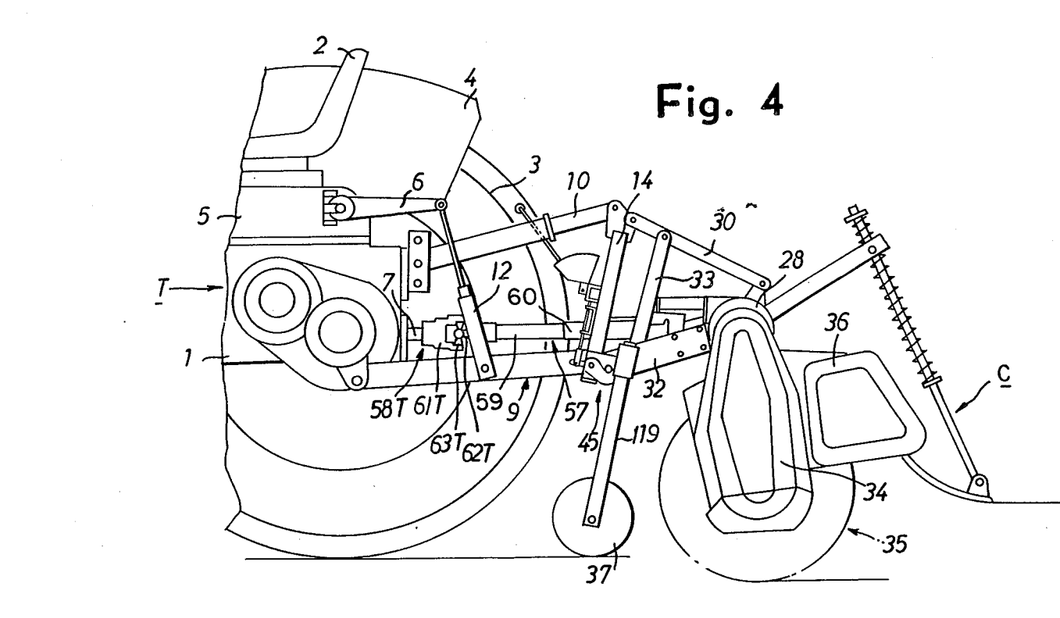
FIG. 4 is an overall side elevation.

With reference to FIGS. 1 to 3, the top link 10 is connected to the lower links 11 at their ends toward the tiller C, i.e., at their rear ends, by a connect assembly 14. The connecting assembly 14 comprises an upwardly projecting tubular main body 15 generally gate-like when seen from the front, a bridge member 16 interconnecting opposite sides vertically intermediate portions of the main body 15, an upper connector 18 comprising a pair of opposed side plates 17 and projecting from the upper end of the widthwise midportion of the main body 15 obliquely rearwardly upward, a lower connector 20 comprising a pair of opposed side plates 19 and projecting rearward from each side portion of the main body 15, a pair of connecting pins 21 each inserted through the lower end of each side portion of the main body 15 and through the opposed side plates 19 of each lower connector 20 laterally.

The rear end of the top link 10 is removably connected to and provided between the side plates 17 of the upper connector 18 at its front portion by a pin 22. The rear portion of each side plate 17 has a recess 23 opened obliquely upwardly rearward. The recess 23 has at its upper portion a width gradually increasing toward its upper end.

Each side plate 19 of the lower connector 20 is formed with a recess 24 opened obliquely rearwardly downward.

The rear end of each lower link 11 is removably connected to an inward portion of the connecting pin 21.

The tiller C, an example of a working implement, is removably attached to the connecting assembly 14 and comprises an input case 28 positioned in the center of its front upper portion, a top mast 30 composed of a pair of opposed side plates 29 and projecting obliquely forwardly upward from the input case 28, a pair of support arms 31 projecting from the case 28 sidewise, a pair of brackets 32 each projecting forward from an intermediate portion of the support arm 31, a pair of support links 33 connecting upper end portions of the side plates 29 of the top mast 30 to the front ends of the respective brackets 32, a transmission case 34 and a side plate extending downward from the outer ends of the support arms 31, 31, respectively, a tilling assembly 35 including a drivingly rotatable tiller shaft laterally extending between and supported by the transmission case 34 and the side plate and having a multiplicity of tines on the tiller shaft, a cover 36 covering the tilling assembly 35, a pair of opposed gauge wheels 37.

The input case 28 has a forwardly projecting input shaft 40 rotatably supported.

An upper connectable portion 42, for example in the form of a round bar having a lateral axis, is provided across the upper ends of the opposed side plates 29 of the top mast 30. The recessed portion 23 of the upper connector 18 is removably engaged with or fitted to the upper connectable portion 42 from below.

The front end of each bracket 32 has a lower connectable portion 43 which is, for example, in the form of a round bar having a lateral axis. The recessed portion 24 of the lower connector 20 of the connecting assembly 14 is removably engaged with or fitted to the lower connectable portion 43 from the front.

An upright tubular holder 118 is attached by a circular connector 117 to a front outer side portion of each bracket 32. A stay 119 for the front gauge wheel 37 extending through the holder 118 is adjustingly movable upward or downward.

A pair of opposite restraining assemblies 45 are provided at respective side lower portions of the connecting assembly 14 for releasably restraining the lower connectable portions 43 of the tiller C from disengaging from the recessed portions 24 of the lower connectors 20 of the assembly 14. Each restraining assembly 45 comprises a hooked lock plate 46, a handle rod 47, a spring 48 and a fixed plate 49.

The lock plate 46, which is disposed outside the lower connector 20 of the connecting assembly 14, is supported by the outer end of the connecting pin 21 on the lower connector 20 and is pivotally movable upward or downward about the pin 21. Through the pivotal movement, the lock plate 46 is shiftable from a restraining position shown in FIG. 1 upward to a preparation position shown in FIG. 2 or downward to an allowing position.

When in the restraining position, the lock plate 46 is disengageably in engagement with the lower connectable portion 43 of the tiller C, restraining the portion 43 from moving out of the recessed portion 24 of the lower connector 20 of the connecting assembly 14.

The lock plate 46 is in its preparation position when the lower connectable portion is to engage in the recessed portion 24 of the lower connector 20.

When in the allowing position, the lock plate 46 permits the lower connectable portion 43 to move out of the recessed portion 24 of the lower connector 20.

The rear end of the lock plate 46 is slanted fowardly upward to provide a cam face 50.

A pair of channel guide members 51 are secured to the main body 15 of the connecting assembly 14 on the rear side of its opposite lower portions. The handle rod 47 extends through each guide member 51 substantially upwardly or downwardly movably.

The handle rod 47 has at its lower end a bifurcated link 52, which is loosely attached to the front end of the lock plate 46 by a pin. With the link 52 loosely attached to the lock plate 46, the handle rod 47 is slightly rotatable about its own axis.

A spring support piece 54 is fitted around the portion of the handle rod 47 positioned within the guide member 51 and is restrained from moving down by a retaining pin 53.

The contact of the retaining pin 53 with the bottom wall of the guide member 51 restrains the handle rod 47 from moving downward, whereby the lock plate 46 is prevented from pivotally moving upward beyond the preparation position.

The spring 48 is wound around the handle rod 47 and bears against the top wall of the guide member 51 and the support piece 54, biasing the lock plate 46 upward toward the preparation position.

The handle rod 47 is fixedly provided with a U-shaped engaging piece 55 at its upper end. The lower portion of the piece 55 is engageable with the upper end of the fixed plate 49 extending upward from the guide member 51, whereby the lock plate 46 is held in the allowing position.

With reference to FIG. 4, the PTO shaft 7 of the tractor T is separably operatively connected to the input shaft 40 of the tiller C by a transmission shaft 57, and a tractor joint 58T and a tiller joint 58C provided at opposite ends of the shaft 57.

The transmission shaft 57 comprises a tubular member 59 providing its front portion and a rod 60 providing its rear portion and slidably splined to the tubular member 59 and is extendable or contractable.

Figure 5:
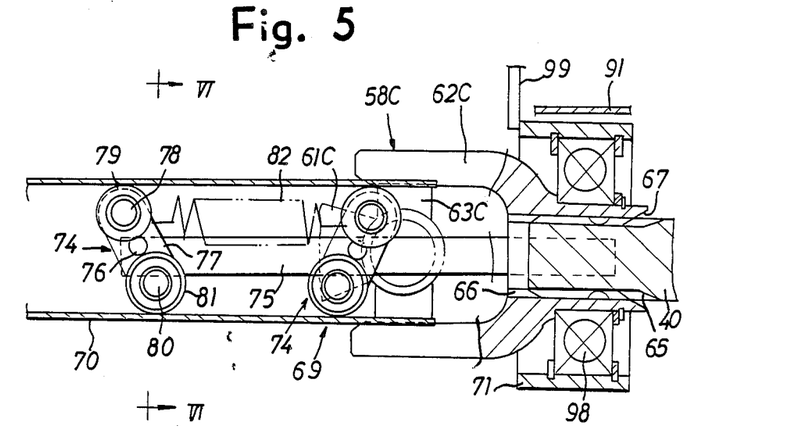
FIG. 5 is a view in section taken along the line V—V in FIG. 3.

With reference to FIG. 5, the tractor and tiller joints 58T, 58C are each in the form of a universal joint and comprise front yokes 61T, 61C, rear yokes 62T, 62C and spiders 63T, 63C, respectively, for interconnecting the front and rear yokes 61T, 61C and 62T, 62C.

The tractor PTO shaft 7 has an internally splined portion removably operatively fitted in an internally splined portion of the front yoke 61T of the tractor joint 58T.

The rear yoke 62T of the tractor joint 58T and the front yoke 61C of the tiller joint 58C are attached to the corresponding ends of the tubular member 59 and the rod 60 of the transmission shaft 57, respectively, and are not rotatable relative to the latter member and rod.

The rear portion of the rear yoke 62C of the tiller joint 58C is internally formed with a splined portion 66 removably fittable to an externally splined portion 65, and a tapered portion 67 smooth-surfaced and tapered axially thereof toward the tractor T. The portions 66 and 67 are arranged in this order toward the tiller C axially of the yoke.

The rear yoke 62C of the tiller joint 58C is separably operatively connected to the input shaft 40 of the tiller C by a clutch 69 which is disposed under the widthwise midportion of the connecting assembly 14. As shown in FIG. 5, the clutch 69 comprises a pair of opposed guides 70, a tubular case 71, and an operating assembly 72 for the case 71, etc.

Figure 6:
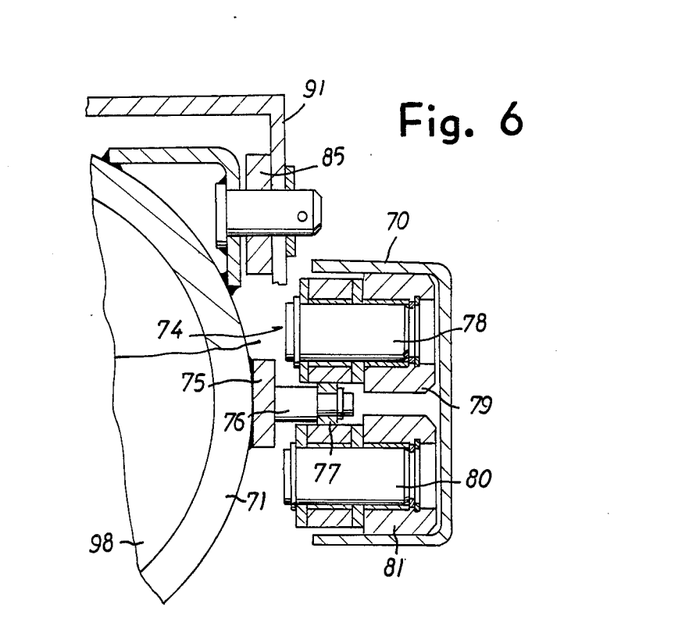
FIG. 6 is a view in section taken along the line VI—VI in FIG. 5.

The guides 70, extending generally longitudinally of the tractor, are disposed under the lengthwise midportion of the bridge member 16 and attached to the lower side of the member 16 by brackets 73. The guides 70 are channel-shaped, opened inwardly toward each other and each include a top wall, bottom wall and side wall.

The tubular case 71 has an axis extending substantially longitudinally of the tractor (in the front-to-rear direction). The rear yoke 62C of the tiller joint 58C is supported by the case 71 with a bearing 98 provided therebetween. The tubular case 71 is provided between the opposed guides 70, supported by slide members 74 on the guides 70 and slidable axially thereof.

By virtue of the axial movement, the tubular case 71 is shiftable between a connecting position where the rear yoke 62C of the tiller joint 58C within the case 71 is operatively joined to the input shaft 40 of the tiller C as seen in FIGS. 1 and 5 and a separating position where the rear yoke 62C within the case 71 is separate from the tiller input shaft 40 as seen in Fig. 2. A pair of opposed support members 75 extend forward from the respective sides at the vertical middle portions of the case 71.

The slide members 74 provided on each guide 70 are at least two in number. According to the present embodiment, a pair of front and rear slide members 74 are mounted on the guide 70. The front slide member 74 is forwardly inclined, while the rear slide member 74 is inclined rearward. The slide members 74 are forwardly away from the tubular case 71 toward the tractor T.

Each slide member 74 comprises a pivotal arm 77 movably supported at its vertically middle portion by a lateral center pivot 76 on the support member 75, an upper roller 79 rotatably supported by a lateral upper shaft 78 on the upper end of the pivotal arm 77 and rollable on the top wall of the guide 70, and a lower roller 81 rotatably supported by a lateral lower shaft 80 on the lower end of the pivotal arm 77 and rollable on the bottom wall of the guide 70. The tubular case 71 is translatable and swingable upward or downward by virtue of the pivotal movement of the slide members 74 about their center pivots 76.

A tensioned holding spring 82, e.g. coiled spring, interconnects upper portions of the pivotal arms 77 of the front and rear slide members 74 inside each guide 70.

The force of the holding spring 82 biases the slide members 74 so as to diminish the angle of inclination of each member 74, holding the upper and lower rollers 79, 81 in contact with the top wall and the bottom wall, respectively, of the guide 70. Consequently, the case 71 is held by the guides 70 in a specified position so as to be translatable and swingable upward or downward With the upper and lower connectors 18, 20 of the connecting assembly 14 joined to the upper and lower connectable portions 42, 43 of the tiller C, the operating assembly 72 for the tubular case 71 serves to shift the case 71 axially thereof to the connecting position or to the separating position The operating assembly 72 comprises a support rod 83, a pair of opposed coupling levers 84, a pair of opposed coupling links 85, a handle lever 86, a holding plate 87, a lock pin 88, a spring 89, etc.

The support rod 83 extends laterally in front of the bridge member 16 and is rotatably supported by a pair of opposed bracket plates 90 on the bridge member 16.

The pair of coupling levers 84 are secured to opposite side portions of the support rod 83, extend downward, and are positioned at opposite side upper portions of the tubular case 71 when seen from the front.

The pair of coupling links 85 extend alongside the upper portions of the opposed guides 70, are positioned inwardly thereof and each have a front end pivoted to the coupling lever 84 and a rear end pivoted to a side upper portion of the case 71.

A gate-shaped cover 91 fixed to the rear portions of the coupling links 85 covers the tiller joint 58C over the portion thereof projecting forward from the case 71, further covering the exposed portion of the tiller input shaft 40.

The handle lever 86 is L-shaped and extends upward from and is fixed to the right end of the support rod 83.

The holding plate 87 extends upward from the right bracket plate 90 and has an upwardly bulging curved lock portion 92 at its upper end. The lock portion 92 is formed with several lock holes 93 equidistantly spaced apart along the curved upper end.

The lock pin 88 is L-shaped, coextensive with the handle lever 86 at the right side thereof and axially movably inserted through a channel guide member 94 secured to the lever 86. A U-shaped restraining piece 95 clamping the lever 86 is secured to the lock pin 88 for restraining the rotation of the pin 88.

The lock pin 88 is removably insertable into the desired one of the lock holes 93 for locking the tubular case 71 in one of several positions with respect to the axial direction of the case. A spring support piece 96 is fitted around the portion of the pin positioned inside the guide member 94 and is prevented from moving down by a pin 97.

The spring 89 is wound around the lock pin 88 and bears against the top wall of the guide member 94 and the support piece 96 to bias the lock pin 88 toward the lock portion 92.

When the rear yoke 62C of the tiller joint 58C is out of alignment with the input shaft 40 to be joined thereto, the two members are aligned with each other by the following means. An upright plate 99 extends upward from the rear end of the tubular case 71 at the widthwise midportion thereof. A positioning pin 100 projecting rearward from the upright plate 99 has a frustoconical rear end.

The input case 28 has a socket member 101 projecting forward from its front side for the positioning pin 100 to engage in. The socket member 101 has a bore 102 formed in its front portion and tapered toward the input case 28 for receiving the pin 100 therein. The rear portion of the member 101 is formed with an opening at its one side and has a stopper 103 with which the rear end of the pin 100 comes into contact.

When the tiller C is to be connected to the tractor T by the embodiment of the above construction, the retaining pin 53 of the restraining assembly 45 is positioned in contact with the bottom wall of the guide member 51 to hold the lock plate 46 in the preparation position as seen in FIG. 2.

The tubular case 71 of the clutch 69 is, for example, in its foremost position as shifted thereto as the separating position (FIG. 2). In this state, the case 71 is positioned at the rear portions of the guides 70.

On the other hand, the tiller C is placed on the ground in a slightly forwardly inclined position as seen in FIG. 2.

In this state, the tractor T is retracted toward the tiller C to position the recessed portions 23, 24 of the upper and lower connectors 18, 20 of the connecting assembly 14 obliquely forwardly below the upper and lower connectable portions 42, 43 of the tiller C, respectively, as seen in FIG. 2.

Next, the three-point link assembly 9, the connecting assembly 14 and the clutch 69 are gradually raised by the hydraulic unit 5 to engage the upper connectable portion 42 of the tiller C first in the recessed portion 23 of the upper connector 18 of the assembly 14. In this state, the recessed portions 24 of the lower connectors 20 are positioned in front of the lower connectable portions 43.

When the three-point link assembly 9, the connecting assembly 14 and the clutch 69 are further raised, the tiller C is turned forward toward the tractor T about the upper connector 18 while being raised since the upper connectable portion 42 is engaged in the upper connector recessed portion 23, whereby the lower connectable portions 43 are brought into contact with the cam faces 50 of the lock plates 46 to engage in the recessed portions 24 of the respective lower connectors 20.

This compresses the springs 48 and pivotally moves the lock plates 46 downward, permitting the lower connectable portions 43 to fully engage in the recessed portions 24 of the lower connectors 20. Each spring 48 thereafter acts to pivotally move the lock plate 46 upward to the restraining position, where the plate 46 is in engagement with the lower connectable portion 43 to prevent the portion 43 from moving out of the lower connector recessed portion 24.

With the upper and lower connectors 18, 20 of the connecting assembly 14 in engagement with the upper and lower connectable portions 42, 43 of the tiller C, the rear yoke 62C of the tiller joint 58C is opposed to the input shaft 40 of the tiller C in the rear of the yoke with a small clearance formed therebetween.

In this case, the front end of the input shaft 40 may be positioned in the tapered portion 67 of the rear yoke 62C.

To fit the rear yoke 62C of the tiller joint 58C around the input shaft 40 from this state, the operator on the seat 2 stretches his hand rearward to grasp the handle lever 86 of the clutch and the lock pin 88. The lock pin 88 is moved upward out of the lock hole 93 in the holding plate 87, and the lever 86 is then turned forward.

This movement rotates the support rod 83, turns the coupling levers 84 and moves the coupling links 85 rearward, whereby the tubular case 71 is shifted rearward with the tiller joint 58C while stretching the transmission shaft 57 to fit the joint 58C around the input shaft 40 as seen in FIGS. 1 and 5. Thus, the internally splined portion 66 of the rear yoke 62C is fitted to the externally splined portion 65 of the input shaft 40.

The lock pin 88 is thereafter released from the hand and inserted into another lock hole 93 of the holding plate 87 to hold the case 71, for example, in the rearmost shifted position as the connecting position.

During the rearward movement of the tubular case 71, the upper and lower rollers 79, 81 of the slide members 74 roll on the top walls and bottom walls of the opposed guides 70.

During the above movement, the slide members 74 are pivotally movable about their center pivots 76, permitting the rear yoke supporting case 71 to translate and swing upward or downward, so that the rear yoke 62C can be joined to the input shaft 40 easily and smoothly even if the rear yoke 62C is upwardly or downwardly out of alignment with the input shaft 40. More specifically, with the insertion of the positioning pin 100 into the tapered bore 102 of the socket member 101, the input shaft 40 is guided by the tapered portion 67 of the rear yoke 62C, allowing the slide members 74 to pivotally move about the center pivots 76 to correct the misalignment of the rear yoke 62C relative to the input shaft 40.

Further because the plurality of slide members 74 are arranged in the front-to-rear direction inside each guide 70, the case 71 and the tiller joint 58C can be supported properly.

The slide members 74 supporting the tubular case 71 are positioned to the front of the case 71 closer to the tractor, so that the rear portion of the transmission shaft 57, the tiller joint 58C and the case 71 can be supported by the guides 70 with good balance, for example, without the likelihood of the case 71 greatly tilting toward the tractor. This feature faciliates the connection of the tiller joint 58C to the tiller input shaft 40 and permits the guides 70 to be positioned at a large distance from the tiller C to preclude the possible interference between the guide 70 and the tiller C.

The contact of the positioning pin 100 with the stopper 103 of the pin socket member 101 prevents the internally splined portion 66 of the rear yoke 62C from fitting over the externally splined portion 65 of the input shaft 40 over an excessive distance.

Further since the socket member 101 has the side opening at its rear portion, the degree of fitting of the externally splined portion 65 in the externally splined portion 66 can be readily recognized from outside.

In this way, the tiller C is completely connected to the tractor T.

The tiller C can be separated from the tractor T by a procedure reverse to the above. First, with the handle lever 86 of the clutch 69 held by hand, the lock pin 88 is moved upward out of the lock hole 93 in the holding plate, and the lever 86 is shifted rearward, causing the coupling levers 84 and links 85 to shift the tubular casing 71 forward and thereby separating the tiller joint rear yoke 62C from the input shaft 40. The lock pin 88 is then released from the hand, causing the spring 89 to insert the pin 88 into another lock hole 93 in the holding plate 87, whereby the tubular case 71 is held in the separating position.

Next, the handle rod 47 of each restraining assembly 45 is pulled up against the spring 48 to bring the lock plate 46 to the allowing position, and the rod 47 is turned to cause the engaging piece 55 to be held by the upper end of the fixed plate 49 in engagement therewith, whereby the lock plate 46 is held in the allowing position. This renders the lower connectable portion 43 of the tiller C releasable from the recessed portion 24 of the lower connector 20 of the connecting assembly 14.

In this state, the hydraulic unit 5 is operated, causing the three-point link assembly 9 and the connecting assembly 14 to lower the tiller C to place the tilling assembly 35 on the ground.

The three-point link assembly 9 and the connecting assembly 14 are further lowered to tilt the tiller C forward, whereby each lower connectable portion 43 of the tiller C is first released from the recessed portion 24 of the lower connector 20 of the assembly 14. The tiller upper connectable portion 42 is then moved upward relative to the upper connector 18 and released from its recessed portion 23.

Consequently, the tiller C is completely separated from the tractor T.

Figure 7:
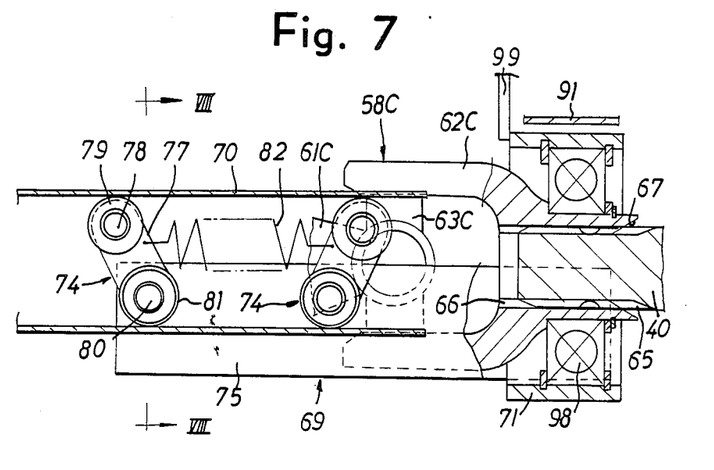
FIG. 7 is a side elevation in vertical section showing a clutch, etc.
Figure 8:
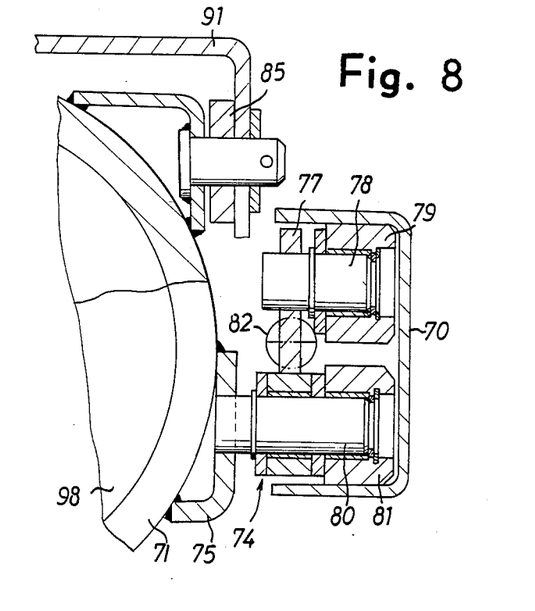
FIG. 8 is a view in section taken along the line VIII—VIII in FIG. 7.

FIGS. 7 and 8 show a second embodiment of the invention, wherein a support member 75 extends forward from each side lower portion of the tubular case 71. The pivotal arm 77 of each slide member 74 is pivoted to the support member 75 by a lower shaft 80.

Alternatively, the slide member pivotal arm 77 may be pivoted to the support member 75 by an upper shaft 78.

Figure 9:
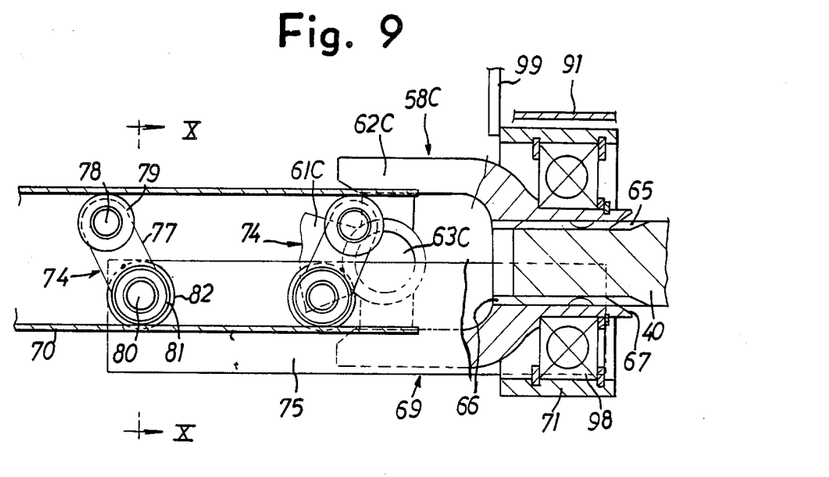
FIG. 9 is a side elevation in vertical section showing a clutch, etc.
Figure 10:
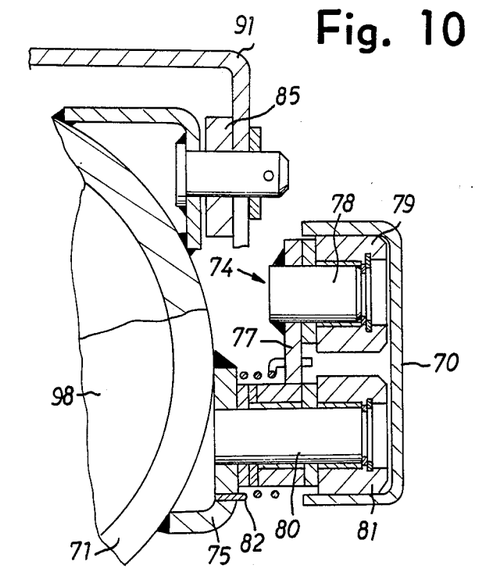
FIG. 10 is a view in section taken along the line X—X in FIG. 9.

FIGS. 9 and 10 show a third embodiment of the invention, in which each slide member 74 is provided with a holding spring 82. The holding spring is wound around the member by which the pivotal arm 77 of each slide member 74 is supported and has one end engaged with the arm 77 and the other end engaged with the support member 75.

Figure 11:
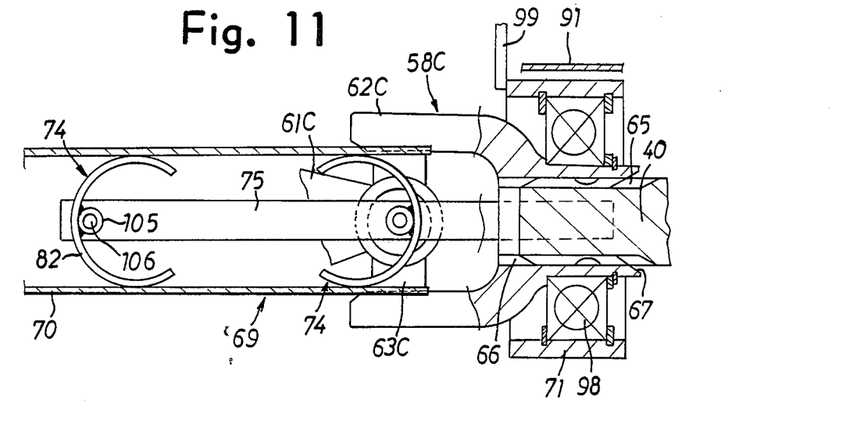
FIGS. 11 to 15 are side elevations in vertical section showing fourth to eighth embodiments, respectively, i.e., clutches, etc.

FIG. 11 shows a fourth embodiment having a holding spring 82 in the form of a curved plate spring and constituting a member of the slide member 74. The holding spring 82 resiliently bears on the top and bottom walls of the guide 70.

The circumferential midportion of the holding spring 82 is fixedly provided with a lateral tube 105. The slide member 74 is pivoted to the support member 75 by a pivot 106 inserted through the tube 105 and the support member 75.

Figure 12:
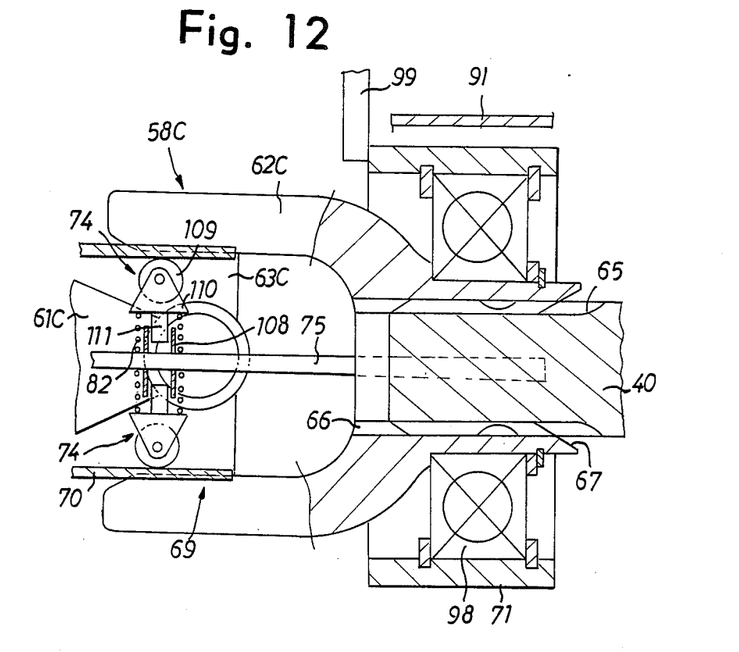

FIG. 12 shows a fifth embodiment of the invention, in which each support member 75 is provided with pairs of upper and lower slide members 74 arranged longitudinally thereof and positioned in the guide 70. Each of the slide members 74 comprises a square tube 108 projecting upward or downward from the support member 75, a roller 109 rollable on the top wall or bottom wall of the guide 70, and a bracket 110 supporting the roller 109.

The bracket 110 has at its base portion a square rod 111 inserted in the square tube 108 axially movably relative thereto and non-rotatably about its axis relative to the tube. A holding spring 82 provided around the square tube 108 and the square rod 111 is interposed between and bears against the support member 75 and the bracket 110. The roller 109 is biased upward or downward by the holding spring 82 and held in pressing contact with the top or bottom wall of the guide 70.

Figure 13:
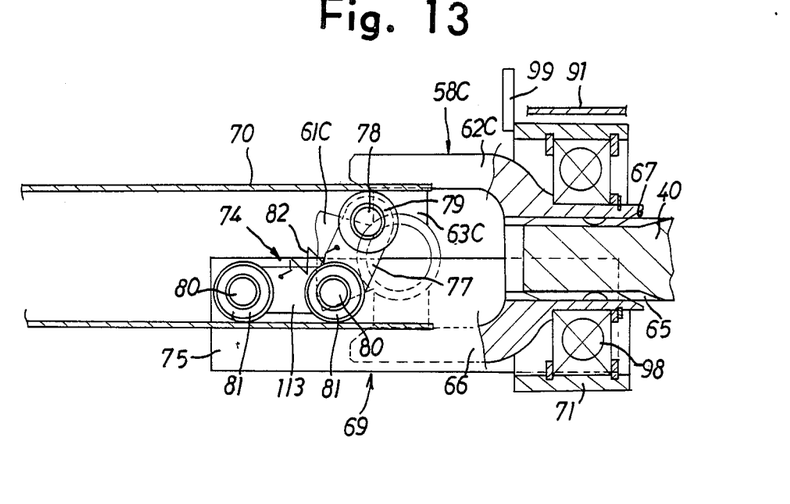
Figure 14:
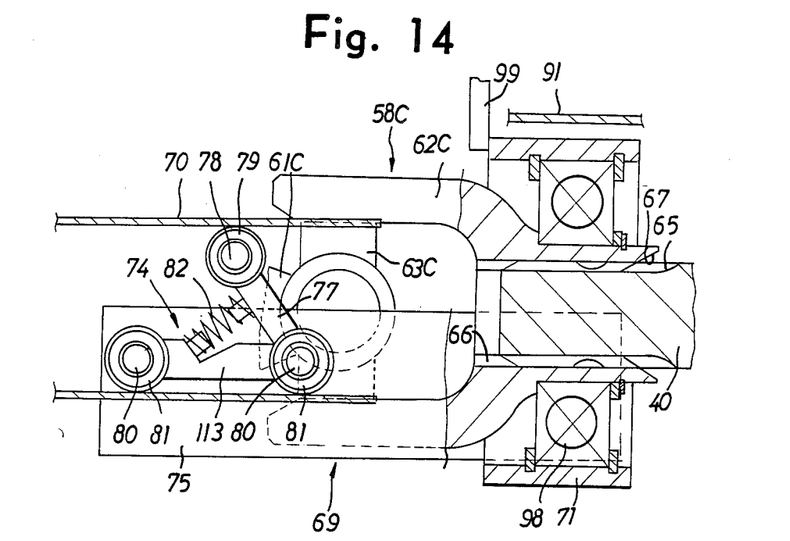
Figure 15:
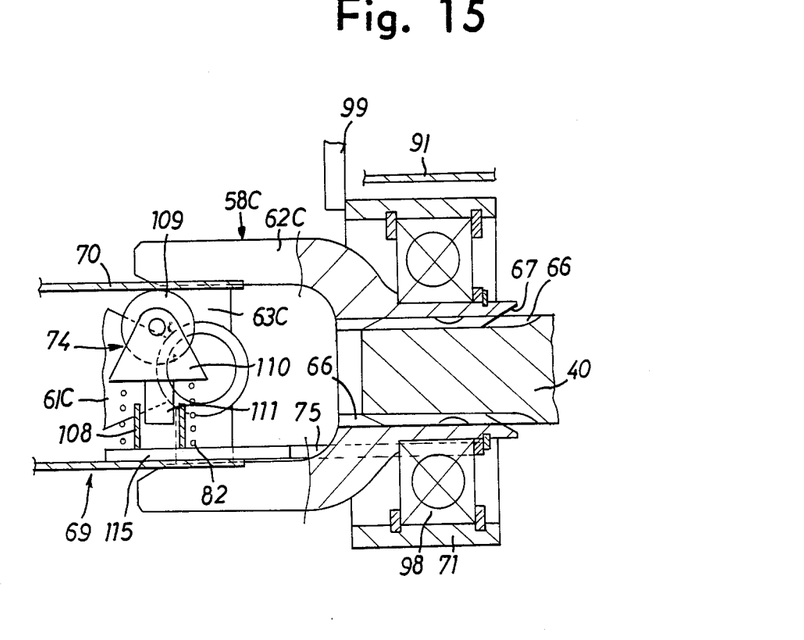

FIGS. 13 to 15 show sixth to eighth embodiments, wherein a single slide member 74 is provided in each guide 70. Unlike the first to fifth embodiments wherein a plurality of slide members 74 are provided in each guide 70 as arranged longitudinally thereof, these embodiments have the advantages of being simplified in construction and permitting the use of shortened guides 70.

With reference to the sixth embodiment shown in FIG. 13, the slide member 74 has a mount plate 113 on the outer side of the support member 75, a pair of front and rear lower lateral shafts 80 inserted through the mount plate 113 and the support member 75 fixedly, a pair of front and rear lower rollers 81 supported on the respective lower shafts 80 and rollable on the bottom wall of the guide 70, a pivotal arm 77 pivotally movably supported by and projecting upward from the rear shaft 80, and an upper roller 79 supported by a lateral upper shaft 78 on the upper end of the arm 77 and rollable on the top wall of the guide 70.

The pivotal arm 77 is rearwardly inclined. A holding spring 82 connected between the mount plate 113 and the pivotal arm 77 is tensioned, biasing the arm 77 so as to diminish the angle of inclination thereof, whereby the upper and lower rollers 79, 81 are held in contact with the guide top wall and bottom wall, respectively.

With reference to the seventh embodiment of the invention shown in FIG. 14, a pivotal arm 77 is forwardly inclined, and a holding spring 82 is interposed between and bears against the mount plate 113 and the pivotal arm 77.

With reference to the eighth embodiment of the invention shown in FIG. 15, the slide member 74 comprises a base plate 115 fixed to the support member 75 and slidable on the bottom wall of the guide 70, a square tube 108 provided upright on the base plate 115, a roller 109 rollable on the top wall of the guide 70, and a bracket 110 supporting the roller 109.

The bracket 110 has at its base portion a square rod 111 inserted in the square tube 108 axially movably relative thereto and non-rotatably about its axis relative to the tube. A holding spring 82 provided around the square tube 108 and the square rod 111 is interposed between and bears against the base plate 115 and the bracket 110. The roller 109 is biased upward and held in contact with the top wall of the guide 70 by the holding spring 82.

Although universal joints are used for connecting the PTO shaft to the input shaft according to the above embodiments, other joints are usable.

Although the embodiments use a rotary tiller as the working implement, other working implements are also usable.

The present invention can also be embodied as a device for connecting a working implement to the front end of the tractor.

What is claimed is:

1. A device for connecting a working implement to a tractor having a liftable three-point link assembly comprising:
   a central top link and a pair of opposed side lower links, a connecting assembly interconnecting said top link and said lower links at rearward ends thereof;
   said tractor being provided with a lifting unit for raising and lowering the three-point link assembly and the connecting assembly, the connecting assembly comprising:
   an upper connector positioned above a widthwise midportion and a pair of lower connectors positioned at opposite sides;
   said lower connectors being releasably engaged with corresponding connectable portions of the implement when the connecting assembly is raised with the upper connector engaged;
   an extendable transmission shaft extending between a power take off shaft of the tractor and an input shaft of the working implement substantially longitudinally of the tractor;
   said transmission shaft having at opposite ends a tractor joint and an implement joint, the tractor power take off shaft having an externally splined portion removably operatively fitted in an internally splined portion of the tractor joint, the implement input shaft having an externally splined portion removably operatively fitted in an internally splined portion of the implement joint;
   said connecting assembly being provided with a clutch for selectively operatively connecting the implement joint to the implement input shaft;
   said clutch comprising guide means positioned substantially longitudinally of the tractor and fixed to the connecting assembly;
   a tubular case having an axis extending substantially longitudinally of the tractor and supported by slide members on the guide means movably in the axial direction; and
   a remotely actuated operating assembly for the tubular case, the tubular case having the implement joint inserted therein and being movable axially thereof while extending or contracting the transmission shaft to thereby shift the implement joint is operatively connected to the implement input shaft and a separating position where the implement joint is separate from the input shaft, each of the slide members being provided with a spring for holding the tubular case on the guide means translatably and swingably in an upward or downward direction, the operating assembly being selectively operable to shift the tubular case and the separating position to the connecting position after the upper and lower connectors of the connecting assembly are respectively held by the upper and lower connectable portions of the working implement in engagement therewith.

2. A device as defined in claim 1 wherein the upper connector of the connecting assembly is formed with an upwardly open recessed portion, the lower connector being formed with a recessed portion opened toward the implement, the upper and lower connectable portions of the working implement being each in the form of a round bar having a lateral axis and engageable in the recessed portions of the upper and lower connectors respectively, a pair of opposite restraining assemblies being provided for releasably restraining the lower connectable portions from moving out of the recessed portions of the lower connectors.

3. A device as defined in claim 2 wherein when the upper and lower connectable portions of the working implement are to be engaged with the upper and lower connectors of the connecting assembly, the connecting assembly is raised by the lifting unit to engage the upper connectable portion of the working implement in the recessed portion of the upper connector first, and the connecting assembly being thereafter further raised, thereby permitting the working implement to rotate about the upper connector toward the tractor under gravity to engage the lower connectable portions of the implement in the recessed portions of the lower connectors.

4. A device as defined in claim 3 wherein each of the restraining assemblies comprises a lock plate engageable with the lower connectable portion from below, a handle rod provided on one side of the connecting assembly movable substantially upward and downward and connected to the lock plate, a spring for biasing the lock plate upward through the handle rod and a fixed plate secured to a side portion of the connecting assembly, the lock plate being pivoted to the lower connector by a lateral pin and being pivotally movable from a restraining position upward to a preparation position and downward to an allowing position, the lock plate being in engagement with the lower connectable portion to restrain the lower connectable portion from moving out of the recessed portion of the lower connector when in the restraining position, the lock plate being in the preparation position when the lower connectable portion is to engage in the recessed portion of the lower connector, the lock plate permitting the lower connectable portion to move out of the lower connector recessed portion when in the allowing position, the lock plate being formed with a cam face at one end thereof toward the working implement and being pivotally movable from the preparation position downward toward the allowing position beyond the restraining position by the contact of the lower connectable portion with the cam face when the lower connectable portion moves toward the lower connector recessed portion to thereby permit the lower connectable portion to engage in the lower connector recessed portion, the fixed plate being engageable with the handle rod to hold the lock plate in the allowing position.

5. A device as defined in claim 1 wherein each of the joints is a universal joint comprising a pair of front and rear yokes and a spider interconnecting the yokes, and one of the yokes of the implement joint is inserted in the tubular case.

6. A device as defined in claim 5 wherein the yoke in the tubular case has inside thereof the internally splined portion and a tapered portion smooth-surfaced and tapered axially thereof toward the tractor, the tapered portion being adjacent the internally splined portion and positioned closer to the working implement than the internally splined portion.

7. A device as defined in claim 1 wherein the clutch is disposed under the widthwise midportion of the connecting assembly.

8. A device as defined in claim 1 wherein the guide means comprises a pair of opposed channel-shaped guides opened inward toward each other, each of the guides having a top wall, a bottom wall and a side wall, the tubular case being in the form of a hollow cylinder, a pair of support members supporting the slide members thereon and projecting toward the tractor from the respective sides of the tubular case, the slide members being disposed inside the guides and being slidable on the top wall and the bottom wall, the slide members being positioned closer to the tractor than the tubular case.

9. A device as defined in claim 8 wherein a pair of the slide members are provided inside each of the guides and arranged longitudinally of the tractor.

10. A device as defined in claim 9 wherein the slide member toward the tractor is so inclined as to be positioned closer to the tractor toward its upper end, and the slide member toward the working implement is so inclined as to be positioned closer to the implement toward its upper end, each of the slide members comprising a pivotal arm, an upper roller supported by a lateral upper shaft on the upper end of the pivotal arm and rollable on the top wall of the guide, and a lower roller supported by a lateral lower shaft on the lower end of the pivotal arm and rollable on the bottom wall of the guide, the pivotal arm being movably supported at a pivot point, a holding spring biasing each slide member so as to diminish the angle of inclination thereof to hold the upper and lower rollers respectively in contact with the top wall and the bottom wall of the guide.

11. A device as defined in claim 10 wherein the holding spring is provided between the pivotal arms of the front and rear slide members.

12. A device as defined in claim 10 wherein the holding spring is provided for the pivotal arm of each slide member and wound around the support portion of the pivotal arm, and the holding spring has one end engaged with the pivotal arm and the other end engaged with the support member.

13. A device as defined in claim 9 wherein the holding spring is in the form of a curved plate spring resiliently bearing on the top wall and the bottom wall of the guide and constituting a component of the slide member, the holding spring being fixedly provided with a lateral tube at the circumferential midportion thereof, the slide member being pivotally movably supported on the support member by a pivot inserted through the tube.

14. A device as defined in claim 8 wherein each of the support members is provided with pairs of upper and lower slide members arranged longitudinally thereof and positioned in the guide, wherein each of the slide members comprises a square tube projecting from the support member, a roller rollable on a wall of the guide, and a bracket supported on the roller, the bracket having at its base portion a square rod inserted in the square tube axially movable relative thereto and non-rotatable about its axis relative to the tube, a holding spring being provided around the square tube and the square rod and interposed between the support member and the bracket in bearing contact therewith, the roller being biased in contact with a wall of the guide by the holding spring.

15. A device as defined in claim 8 wherein one of the slide members is singly provided in each of the guides.

16. A device as defined in claim 15 wherein each slide member has a mount plate on the outer side of the support member, a pair of front and rear lower lateral shafts fixedly inserted through the mount plate and the support member, a pair of front and rear lower rollers supported on the respective lower shafts and rollable on the bottom wall of the guide, a pivotal arm pivotally movably supported by and projecting upward from the lower shaft positioned closer to the working implement, and an upper roller supported by a lateral upper shaft on the upper end of the pivotal arm and rollable on the top wall of the guide, the pivotal arm being inclined as toward its upper end, a holding spring being provided between the mount plate and the support member and biasing the pivotal arm so as to diminish the angle of inclination thereof and to hold the upper and lower rollers respectively in contact with the top wall and the bottom wall of the guide.

17. A device as defined in claim 15 wherein the slide member comprises a base plate fixed to the support member and slidable on the bottom wall of the guide, a square tube provided upright on the base plate, a roller rollable on the top wall of the guide, and a bracket supporting the roller thereon, the bracket having at its base portion a square rod inserted in the square tube axially movable relative thereto and non-rotatable about its axis relative to the square tube, a holding spring being wound around the square tube and the square rod and provided between the base plate and the bracket in bearing contact therewith, the roller being biased upward and held in contact with the top wall of the guide by the holding spring.

18. A device as defined in claim 1 wherein the operating assembly comprises a support rod rotatable about its own axis and extending laterally at a vertically intermediate portion of the connecting assembly, a pair of coupling levers extending downward from opposite side portions of the support rod, a pair of opposed coupling links pivotably connecting the coupling levers to the respective side portions of the tubular case, a handle lever fixed to one end of the support rod and extending upward therefrom, a holding plate secured to the connecting assembly and having several lock holes arranged longitudinally of the tractor, a lock pin provided alongside the handle lever movable longitudinally thereof and removably insertable into the lock holes, and a spring wound around the lock pin for biasing the lock pin in a direction to insert the lock pin through the lock hole.

19. A device as defined in claim 1 wherein the tubular case has a positioning pin projecting therefrom toward the working implement and having a frustoconical forward end, and wherein the working implement has an input case provided with a socket member for the positioning pin to removably align the implement joint with the input shaft, the socket member being formed in its forward end with a bore tapered toward the input case for receiving the positioning pin therein, the socket member being provided at its base portion with a side opening and a stopper for the positioning pin end to come into contact therewith.

* * * * *